(12) United States Patent
Ruiz Dealbert et al.

(10) Patent No.: US 12,076,947 B2
(45) Date of Patent: Sep. 3, 2024

(54) STIFFENED PANEL OF COMPOSITE MATERIALS AND METHOD FOR THE MANUFACTURE OF SAID PANEL

(71) Applicant: MUELLES Y BALLESTAS HISPANO-ALEMANAS PROJECTS, S.L., Villarreal (ES)

(72) Inventors: Miguel Ruiz Dealbert, Villarreal (ES); Juan Salamero Laorden, Villarreal (ES); Roberto Estal Vera, Villarreal (ES); Maria del Mar Cuetos Gómez, Villarreal (ES)

(73) Assignee: MUELLES Y BALLESTAS HISPANO-ALEMANAS PROJECTS, S.L., Villarreal (ES)

( * ) Notice: Subject to any disclaimer, the term of this patent is extended or adjusted under 35 U.S.C. 154(b) by 220 days.

(21) Appl. No.: 17/432,400

(22) PCT Filed: Feb. 18, 2020

(86) PCT No.: PCT/ES2020/070115
§ 371 (c)(1),
(2) Date: Aug. 19, 2021

(87) PCT Pub. No.: WO2020/169865
PCT Pub. Date: Aug. 27, 2020

(65) Prior Publication Data
US 2022/0184903 A1    Jun. 16, 2022

(30) Foreign Application Priority Data
Feb. 19, 2019    (EP) ..................................... 19382117

(51) Int. Cl.
*B29C 70/70*    (2006.01)
*B29C 70/48*    (2006.01)
(Continued)

(52) U.S. Cl.
CPC .............. *B29C 70/70* (2013.01); *B29C 70/48* (2013.01); *E04C 2/16* (2013.01); *E04C 2/38* (2013.01);
(Continued)

(58) Field of Classification Search
CPC . B29C 70/70; B29C 70/48; E04C 2/16; E04C 2/38; B29K 2105/0863; B29K 2105/0872
(Continued)

(56) References Cited

U.S. PATENT DOCUMENTS 1,549,721 A * 8/1925 Kraft ......................... B64B 1/58
                                                    52/396.04
3,490,983 A * 1/1970 Lee ........................ B29C 53/582
                                                    428/116
(Continued)

FOREIGN PATENT DOCUMENTS

DE          3739753      *  6/1989
EP          2946900 A1  * 11/2015   ......... B29C 37/0082

*Primary Examiner* — Mark R Wendell
(74) *Attorney, Agent, or Firm* — QUINN IP LAW

(57) ABSTRACT

Method for manufacturing a stiffened panel of composite materials and a stiffened panel, comprising:
  a skin (1), and
  stiffeners (3, 4),
wherein the manufacturing method comprises the following steps:
  providing a skin (1),
  making a plurality of through drill holes (6) on the skin (1) located in correspondence with areas where the placement of stiffeners (3, 4) is expected,
  introducing threaded bolts (5) in the through drill holes (6) such that the head (11) of the threaded bolt (5) remains housed in the skin (1),
  locating a threaded nut (10) on the free end of the threaded bolts (5), (Continued)

manufacturing the stiffeners (3, 4) such that the threaded bolts (5) and the threaded nut (10) remain embedded in the stiffeners (3, 4).

10 Claims, 4 Drawing Sheets

(51) Int. Cl.
  *E04C 2/16* (2006.01)
  *E04C 2/38* (2006.01)
  *B29K 105/08* (2006.01)

(52) U.S. Cl.
  CPC .............. *B29K 2105/0863* (2013.01); *B29K 2105/0872* (2013.01)

(58) Field of Classification Search
  USPC ................................................. 52/799.1
  See application file for complete search history.

(56) References Cited

U.S. PATENT DOCUMENTS

| | | | | |
|---|---|---|---|---|
| 3,880,533 A * | 4/1975 | Gostling | ............... | E04G 7/307 403/189 |
| 3,910,531 A * | 10/1975 | Leomand | ............... | B64C 1/065 428/116 |
| 4,006,498 A * | 2/1977 | Cuschera | ............... | E03C 1/22 4/286 |
| 4,113,910 A * | 9/1978 | Loyd | ............... | B29C 66/721 403/374.1 |
| 4,206,895 A * | 6/1980 | Olez | ............... | B64C 3/26 428/116 |
| 4,291,081 A * | 9/1981 | Olez | ............... | B29D 99/0014 428/102 |
| 4,310,132 A * | 1/1982 | Frosch | ............... | B64C 1/068 244/119 |
| 4,331,723 A * | 5/1982 | Hamm | ............... | B29D 99/0014 428/113 |
| 4,382,712 A * | 5/1983 | Buchs | ............... | E04C 2/526 403/376 |
| 4,452,657 A * | 6/1984 | Hamm | ............... | B29D 24/008 52/630 |
| 4,715,560 A * | 12/1987 | Loyek | ............... | B29C 70/24 428/116 |
| 4,875,795 A * | 10/1989 | Anderson | ............... | B64C 1/12 403/279 |
| 4,962,904 A * | 10/1990 | Perry | ............... | B29C 70/845 244/133 |
| 5,639,535 A * | 6/1997 | McCarville | ............... | B29C 70/30 156/182 |
| 5,650,229 A * | 7/1997 | Gross | ............... | B29B 11/16 428/113 |
| 5,853,511 A * | 12/1998 | Fairbanks | ............... | B29C 66/7392 156/304.3 |
| 6,173,925 B1 * | 1/2001 | Mueller | ............... | B64C 3/48 244/123.1 |
| 6,505,571 B1 * | 1/2003 | Critchfield | ............... | B63B 3/04 114/65 R |
| 6,749,155 B2 * | 6/2004 | Bergmann | ............... | B64C 1/06 244/119 |
| 6,786,452 B2 * | 9/2004 | Yamashita | ............... | B64C 3/00 244/119 |
| 7,244,487 B2 * | 7/2007 | Brantley | ............... | B29C 65/562 244/123.7 |
| 7,494,092 B2 * | 2/2009 | Brenner | ............... | B64C 1/12 244/119 |
| 7,534,319 B2 * | 5/2009 | Mead | ............... | B32B 15/08 52/309.3 |
| 7,690,164 B2 * | 4/2010 | Walker | ............... | B29C 70/68 52/309.1 |
| 7,850,118 B2 * | 12/2010 | Vichniakov | ............... | B64C 1/12 244/119 |
| 8,038,099 B2 * | 10/2011 | Anast | ............... | B64C 1/12 244/119 |
| 8,082,667 B2 * | 12/2011 | Kulesha | ............... | B64F 5/10 29/897.3 |
| 8,444,090 B2 * | 5/2013 | Reye | ............... | B64C 1/06 244/119 |
| 8,540,833 B2 * | 9/2013 | Deobald | ............... | B29C 70/865 156/181 |
| 8,715,809 B2 * | 5/2014 | Ravey | ............... | F01D 5/282 428/137 |
| 8,734,605 B2 * | 5/2014 | Harrison | ............... | F01D 5/282 264/258 |
| 8,979,473 B2 * | 3/2015 | Lussier | ............... | F01D 25/28 415/174.4 |
| 8,985,516 B2 * | 3/2015 | Kismarton | ............... | B32B 7/12 244/132 |
| 9,102,393 B2 * | 8/2015 | Wilson | ............... | B64C 3/187 |
| 9,447,802 B2 * | 9/2016 | Valembois | ............... | F16B 5/01 |
| 9,550,332 B2 * | 1/2017 | Karem | ............... | B32B 5/26 |
| 9,566,739 B2 * | 2/2017 | Chapman | ............... | G06F 3/0482 |
| 9,592,651 B2 * | 3/2017 | Deobald | ............... | B32B 5/02 |
| 9,993,980 B2 * | 6/2018 | Kline | ............... | B32B 3/18 |
| 10,035,309 B2 * | 7/2018 | McCarville | ............... | B32B 5/02 |
| 10,105,942 B2 * | 10/2018 | Castorina | ............... | B32B 27/18 |
| 10,442,153 B2 * | 10/2019 | Shinozaki | ............... | B32B 3/28 |
| 10,443,409 B2 * | 10/2019 | Sippel | ............... | C04B 35/565 |
| 10,479,049 B2 * | 11/2019 | Delehouze | ............... | B29C 64/165 |
| 10,577,939 B2 * | 3/2020 | Vetters | ............... | F01D 5/147 |
| 10,654,568 B2 * | 5/2020 | Bammer | ............... | B64C 27/04 |
| 10,689,085 B2 * | 6/2020 | Behzadpour | ............... | B64F 5/10 |
| 10,723,436 B2 * | 7/2020 | Cheng | ............... | B29C 43/003 |
| 10,967,586 B2 * | 4/2021 | Guzman | ............... | B29C 70/528 |
| 10,994,825 B2 * | 5/2021 | Jaiswal | ............... | B64C 3/20 |
| 11,041,477 B2 * | 6/2021 | Wardropper | ............... | B29D 99/0028 |
| 11,131,289 B2 * | 9/2021 | Hawkins | ............... | F03D 1/0675 |
| 11,326,576 B2 * | 5/2022 | Randall | ............... | B29D 99/0028 |
| 11,685,503 B2 * | 6/2023 | Behzadpour | ............... | B64C 3/182 244/119 |
| 2005/0064134 A1 * | 3/2005 | Brantley | ............... | F16B 11/006 428/119 |
| 2008/0297967 A1 * | 12/2008 | Winter | ............... | B64D 37/32 244/1 A |
| 2011/0315824 A1 * | 12/2011 | Pook | ............... | B29C 70/443 264/102 |

* cited by examiner

STIFFENED PANEL OF COMPOSITE MATERIALS AND METHOD FOR THE MANUFACTURE OF SAID PANEL

CROSS REFERENCE TO RELATED APPLICATIONS

This application claims the benefit of PCT Patent Application No. PCT/ES2020/070115 filed on Feb. 18, 2020, entitled "STIFFENED PANEL OF COMPOSITE MATERIALS AND METHOD FOR THE MANUFACTURE OF SAID PANEL," which is incorporated by reference in its entirety in this disclosure.

FIELD OF THE INVENTION

The invention refers to a method for manufacturing a panel made of composite materials and stiffened by means of longitudinal and transverse stiffeners to said panel. In particular, the manufacture of the stiffeners is part of the manufacturing process instead of being a subsequent operation.

BACKGROUND

Current composite material assembly techniques are based on bolted joints, adhesive joints and welded joints.

Bolted joints are the main composite material assembly technique. Despite having many advantages, such as e.g. their low price or the flexibility of assembly and disassembly, there are disadvantages to be taken into account according to their application. Not only the concentration of stresses of the drill holes poses great difficulty, but the stiffness and the anisotropic strength, the low interlaminar shear strength, and the tensile strengths across the thickness can cause failures by way of breaking. Depending on the materials to be joined, failures can be classified in two ways: failure in the materials to be joined or failure in the joining element. In the case of composite materials, it has been shown that failure usually occurs in the materials to be joined.

On the other hand, adhesive joints also have advantages, such as their great saving in weight against bolted joints and the decrease in the concentration of stresses, since it is not necessary to drill the surfaces. However, they have disadvantages that have to be taken into account, such as the impossibility to disassemble the assembly, the degradation of the adhesive joints by the action of environmental agents, and the difficult preparation of surfaces, which sometimes affects the joining.

Finally, there is the possibility to opt for welded joints, which solve the problem of stress concentration and do not require a very thorough preparation of surfaces. In contrast, it is a type of joint that is only valid for thermoplastic materials and cannot be disassembled and where a scarcely automatable operation is added to the process, which requires experienced personnel and it is thus slow and very costly. In addition, guaranteeing the quality of these joints is a difficult task as the inspection thereof is complicated.

A common aspect to the three types of joints points to manufacturing systems based on multiple, necessarily sequential operations that are hard to be automated, which entails slow manufacturing times and hence costly manufacturing systems.

SUMMARY OF THE INVENTION

The object of the present invention is to mitigate the drawbacks of the joints described above by means of a joining method integrated in the stiffeners manufacturing process itself, whilst guaranteeing the integrity thereof, simplifies the production process, bringing down manufacturing costs and times. Therefore, the joining is one of the operations of the process itself.

The novelty of this system lies in that the ribs are manufactured by leaving the mechanical joint embedded in the panel, such that the final element is a single component, as opposed to current manufacturing systems based on the joining of independent components.

The difference this manufacturing system makes in contrast to conventional manufacturing systems in aeronautical or railway applications consists in the manufacture of the skin and the stiffeners as a single element. This method speeds up the manufacturing process, bringing down both the manufacturing times and the costs of the process by decreasing the number of intermediate and final operations in comparison to presently known manufacturing systems.

Therefore, one of the objects of the invention is a method for manufacturing a stiffened panel of composite materials, comprising:
  a skin in laminar form that comprises an inner face and an outer face, and
  stiffeners located on the inner face of said skin and located in longitudinal and transverse directions thereto,
wherein the manufacturing method is characterised in that it comprises the following steps:
  providing a skin,
  making a plurality of through drill holes on the skin located in correspondence with areas where the placement of stiffeners is expected,
  introducing threaded bolts in the through drill holes, wherein the threaded bolts comprise a body and a head, such that the head of the threaded bolt remains housed in the skin,
  setting a threaded nut on the free end of the threaded bolts opposite the head,
  manufacturing the stiffeners on the inner face of the skin, such that the threaded bolts and the threaded nut remain embedded in the stiffeners.

The present invention consists in a manufacturing method for a stiffened panel that allows the method steps to be merged into a single method that includes the operation of joining the skin and the stiffeners. In addition, it also has the possibility of joining different composite materials, made even by means of different manufacturing methods, as an advantage.

The joint consists in a mechanical joint by means of a bolt, preferably with a flat finish on both ends of the bolt, such that its placement is part of the said single manufacturing process and such that it remains embedded between both components to be joined, i.e. between the skin and the stiffeners.

The above method reduces the concentration of stresses that is generated in commonly known bolted joints and reduces the number of operations in comparison with any other joining system, resulting in to faster, less expensive manufacturing processes.

The above method is based on the bolted joint technique, the drawback of the concentration of stresses generated in the drill holes where the corresponding mechanical joints are housed being improved due to the mechanical joint remaining embedded in the joint itself between the skin and the stiffeners, such that the bolt remains jointly joined to the stiffeners, which are in turn jointly joined to the skin, the stresses of the bolt in the through drill holes being thus counteracted.

To this end, a series of drill holes are made, preferably in the form of a grid, on the skin at those spots matching, in an exemplary embodiment, the subsequent intersection between transverse and longitudinal stiffeners. These drill holes can preferably have a countersunk shape on the skin and will be the spots where the bolts will be introduced. Said screws are inserted through the skin such that the head of the screw remains preferably flush with the skin itself, encouraging the keeping of the flat shape of its surface.

The threaded bolt goes through the skin, part of its threaded body, where a bolt will be threaded on the other end, being left exposed. Once all bolts have been introduced in the skin, the stiffener system will be manufactured thereon and on the inner face of the skin.

It is also an object of the invention a panel characterised in that it comprises:
- a set of through drill holes located on the skin in correspondence with areas where the placement of stiffeners is expected,
- a set of threaded bolts configured for the joining of the skin and the stiffeners and located in the set of through drill holes, wherein the threaded bolts comprise a body and a head,
- a threaded nut located on the free end of the threaded bolts opposite the head,
- wherein the heads of the threaded bolts are embedded in the skin and the threaded bolts and the body are embedded in the stiffeners.

DESCRIPTION OF THE FIGURES

Some figures have been provided to complete the description and in order to help to better understand the invention. Said figures are an integral part of the description and illustrate an exemplary embodiment of the invention.

DETAILED DESCRIPTION OF THE INVENTION

The joining of two components manufactured with different types of composite materials and by means of different manufacturing techniques is described in the embodiment shown in the figures.

According to the object of the invention, the component named skin (1), a first component manufactured by means of the infusion (LRI), the CRTM or the RTM method, all of them methods for manufacturing a composite material using resin and dry fibre, which could be of either glass or carbon, would be manufactured first.

The infusion technique consists in placing layers of fibre on a mould and covering them hermetically with a bag that is sealed at the edges. Next, the air that might be present between the bag and the reinforcement is removed, and the resin is injected. The bag would perform the function of upper mould. Once the injection is over, and after the curing process, the bag is removed.

Conversely, the RTM method consists in placing the fibre layers on a lower mould, closing it with an upper mould and injecting the resin at a certain pressure after removing the air that might remain in the interior to encourage the passage of the resin through the reinforcing layers. This process admits multiple variants according to the working pressure, such as:
Low pressure RTM (LP-RTM)
High pressure RTM (HP-RTM)
Compression RTM (CRTM)

Figure 1:
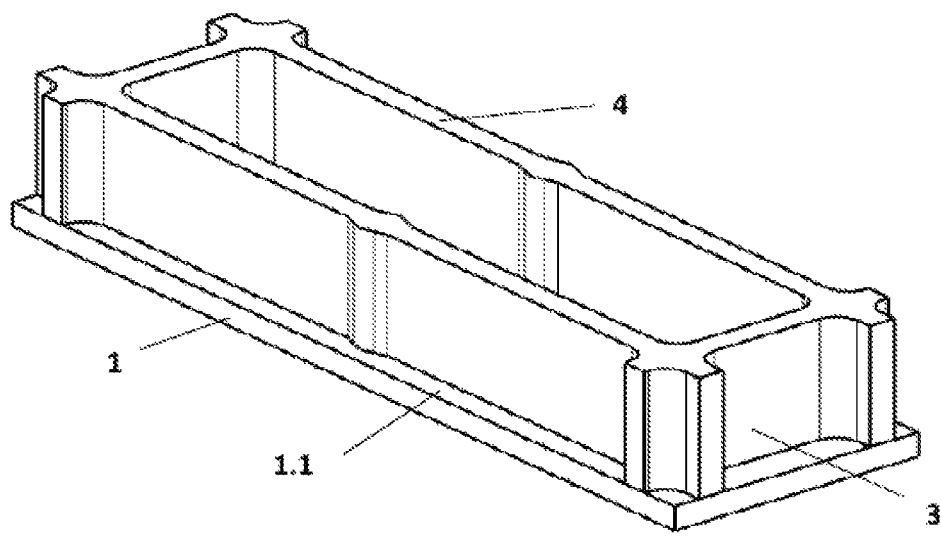
FIG. 1 is a perspective view of an embodiment of the panel which is the object of the invention. The flat shape of the skin and the system of stiffeners created to provide the skin with stiffness can be seen in it.

FIG. 1 shows the skin (1) and the system of stiffeners (3, 4), which will be both longitudinal (4), or spars, and transverse (3), or ribs, created to provide the skin (1) with stiffness. The mechanical joints cannot be seen from the side of the stiffeners (3, 4) because the invention has been conceived so that the mechanical joints remain embedded, such that they remain hidden inside the assembly when viewed from the inner face. The mechanical joint remains embedded in the panel, hidden from the inner face of the assembly and visible only from the outer part, the threaded bolt (5) remaining flush with the skin (1).

Figure 2:
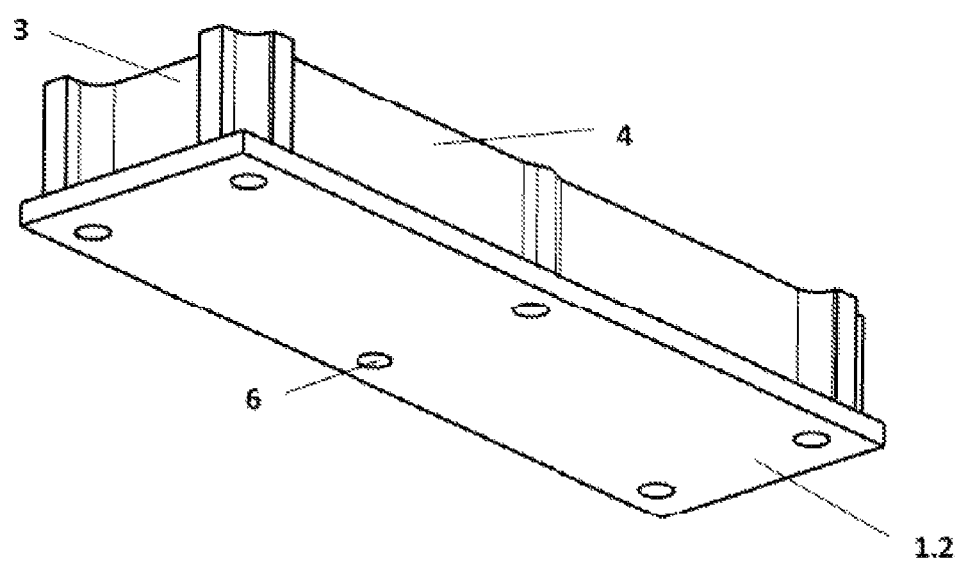
FIG. 2 is a bottom perspective view of the embodiment corresponding to FIG. 1, where the mechanical joint is seen embedded in the assembly, such that the head is flush with the skin.

FIG. 2 is a bottom perspective view from where the through drill holes (6) of the skin (1) can be seen, the mechanical joint being embedded in the panel such that the head (11) is flush with the skin (1). In an embodiment, the threaded bolt (5) comprises a body (7) and a head (11), the head (11) having a countersunk shape and remaining flush with the skin (1) to keep the flat shape thereof (1) on its outer face (1.2).

Figure 3:
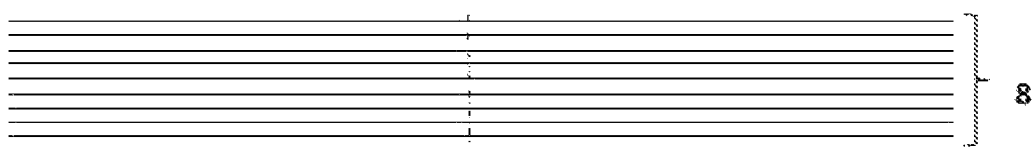
FIG. 3 shows the stacking of the layers of dry fibre to manufacture the skin. The number of layers and the resin-to-fibre ratio will be calculated specifically for each application.

FIG. 3 shows the stacking of the layers of dry fibre (8) to manufacture the skin (1). The number of layers and the resin-to-fibre ratio will be calculated specifically for each application. Regardless of whether the manufacturing process is by means of the infusion or the RTM method, the stacking of the dry fibre (8) will be done the same way, with the variant of different fibre weights and volumes being used. The manufacturing method will have bearing on the manner in which the resin is injected: in the case of infusion, the vacuum will be created by means of a bag, which will act as the upper mould, and in the case of RTM, by means of the application of pressure on closing an upper mould and injecting the resin at a certain pressure.

Figure 4:
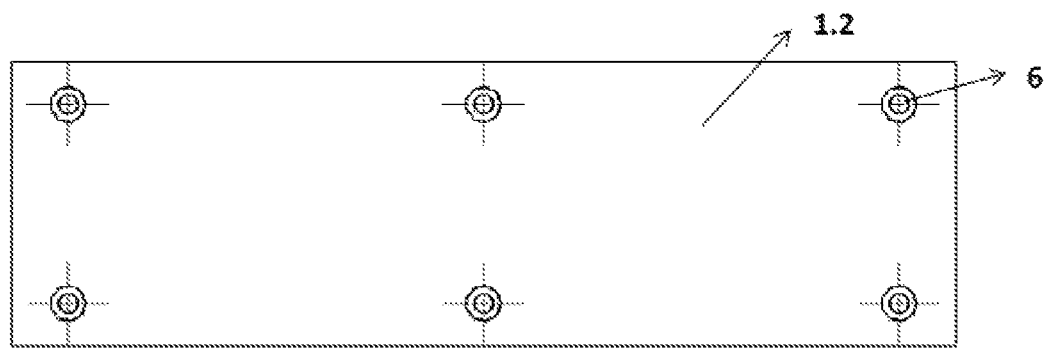
FIG. 4 shows the system of drill holes made on the skin having a countersunk shape toward the outer face of the skin through which the bolts are introduced.

The system of through drill holes (6) made on the skin (1) can be seen in FIG. 4. As mentioned above, the through drill holes (6) have a countersunk shape toward the outer face (1.2) of the skin (1) through which the threaded bolts (5) will be introduced.

In the embodiment shown in the figures, the spots where the through drill holes (6) are to be made will correspond to the intersections of the system of longitudinal stiffeners (4) and transverse stiffeners (3). In addition, in the embodiment shown there are also through drill holes (6) on the longitudinal stiffeners (4) in correspondence with intermediate areas in between areas where they meet transverse stiffeners (3).

Figure 5:
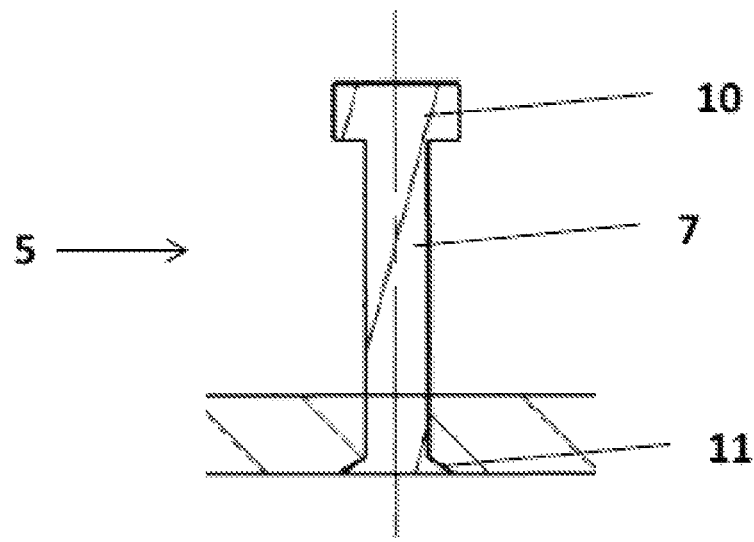
FIG. 5 shows a section of the panel of the embodiment showing the joint after the introduction of the bolt through the skin. It can be seen how the countersunk shape remains flush with the outer face of the skin and the bolt located on the opposite end.

A section of the joint after the threaded bolt (5) has been introduced through the skin (1) has been depicted in FIG. 5. It can be seen how the head (11) remains flush with the outer face (1.2) of the skin (1), which contributes to keeping the flat shape of the outer face (1.2) of the skin (1).

On the other hand, the thread (10) of the threaded bolt (5) located on the end opposite the head (11), threaded on the threaded bolt (5), is also shown. The nut (10) will preferably have its outer face flat, such that the free end of the stiffeners (3, 4) remains flat too.

Figure 6:
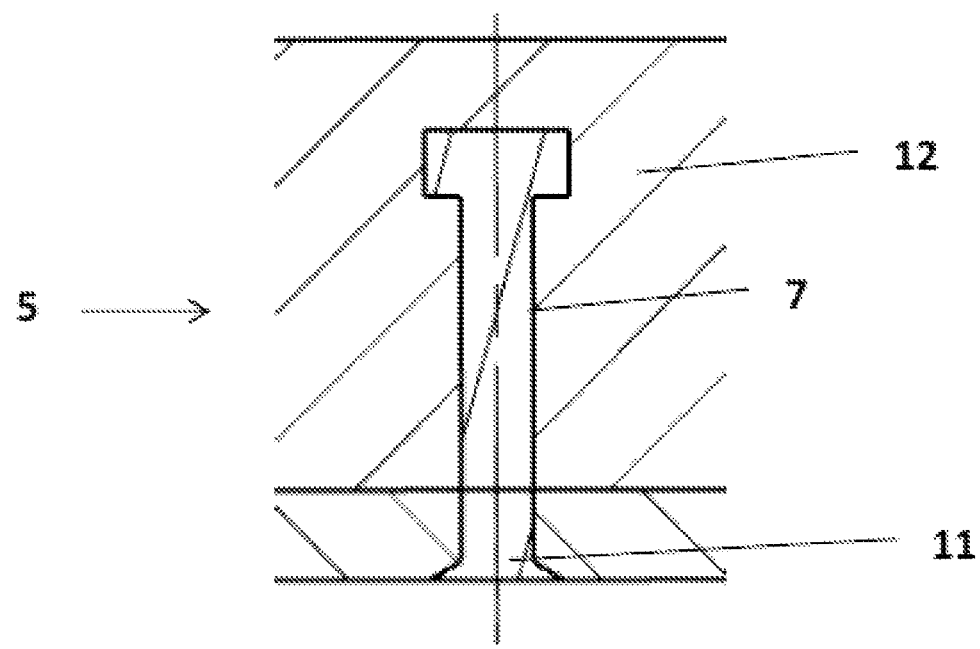
FIG. 6 shows a section of the panel of the embodiment showing how the mechanical joint remains embedded between the skin and the stiffeners.

FIG. 6 shows the final step of the invention, wherein the mechanical joint remains embedded in the skin (1) and the stiffeners (3, 4).

In order to manufacture the stiffeners (3, 4), a plurality of layers of composite material are stacked on top of the inner face (1.1) of the skin (1). The layers of the stiffeners (3, 4) could be of a pre-impregnated material, such as SMC, BMC or pre-preg. After the layers of composite material are stacked, a mould would be set in place to shape them. In an embodiment, the plurality of layers of the stiffeners (3, 4) can be manufactured with Sheet Moulding Compound (SMC). Additionally, before the step of manufacturing the stiffeners (3, 4), the outer face (1.2) of the skin (1) could be situated on top of a mould.

Due to the complexity of the shape of the stiffeners (3, 4), the manufacturing method will preferably use Sheet Moulding Compound (SMC) or Bulk Moulding Compound (BMC).

Nevertheless, any moulding method by compression of pre-impregnated mouldable half-finished products will generically be valid. The technique consists in stacking a series of layers previously calculated for the specific application, in this case, on top of the inner face (1.1) of the skin (1) where the threaded nuts (10) of the threaded bolts (5) inserted through the through drill holes (6) of the skin (1) are.

According to the above, in an embodiment, the stiffeners (3, 4) are manufactured by resting the skin (1) with the through drill holes (6) inserted on a flat mould and then stacking the layers of SMC—pre-impregnated mouldable half-finished products—such that they remain resting on the inner face (1.1) of the skin (1) and on top of the threads of the bolts (5) introduced in the through drill holes (6). A pre-shaped upper mould will be needed to shape the layers of pre-impregnated material on closing it. On closing it, previously heated, and by applying pressure, the system of stiffeners (3, 4) will be shaped.

Figure 7:
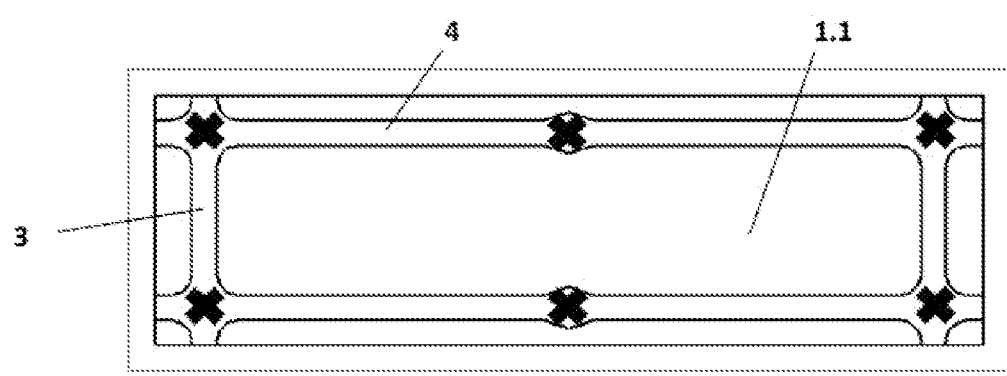
FIG. 7 is a floor plan view showing the spots where the bolts would remain embedded. These spots correspond to the intersections of the longitudinal and transverse stiffeners and to intermediate positions of the longitudinal stiffeners.

FIG. 7 depicts the spots where the threaded bolts (5) would remain embedded. These spots correspond to the intersections of the system of stiffeners (3, 4), with other additional spots located at intermediate positions between intersections of the longitudinal stiffeners (4), as depicted in the figure.

The invention claimed is:

1. A method for manufacturing a stiffened panel of composite materials, comprising:
    a skin in laminar form that comprises an inner face and an outer face, and
    stiffeners located on the inner face of said skin and situated in longitudinal and transverse directions thereto,
wherein the manufacturing method includes the following steps:
    providing a skin,
    making a plurality of through drill holes on the skin located in correspondence with areas where the placement of stiffeners is expected,
    introducing threaded bolts in the through drill holes, wherein the threaded bolts comprise a body and a head, such that the head of the threaded bolt remains housed in the skin,
    after the introduction of the bolts through the skin, locating a threaded nut on a free end of the threaded bolts opposite the head, and
    once the bolts have been introduced into the skin, manufacturing the stiffeners on the inner face of the skin by stacking on top of the inner face of the skin a plurality of layers of composite material, such that the threaded bolts and the threaded nut remain embedded within the stiffeners.

2. The method for manufacturing a stiffened panel of composite materials, according to claim 1, wherein the layers of composite material of the stiffeners are pre-impregnated.

3. The method for manufacturing a stiffened panel of composite materials, according to claim 2, wherein the stiffeners are manufactured using a pre-impregnated material such as: Sheet Moulding Compound (SMC), Bulk Moulding Compound (BMC) or pre-preg.

4. The method for manufacturing a stiffened panel of composite materials, according to claim 1, wherein, after the stacking of the layers of composite material, a mould is set in place to shape them.

5. The method for manufacturing a stiffened panel of composite materials, according to claim 1, wherein, before the step of manufacturing the stiffeners, the outer face of the skin is located on a mould.

6. The method for manufacturing a stiffened panel of composite materials, according to claim 1, wherein the skin is manufactured by infusion (LRI), RTM, CRTM or HP-RTM made of resin and dry fibre, glass or carbon fibre.

7. The method for manufacturing a stiffened panel of composite materials, according to claim 1, wherein the head of the threaded bolt remains flush with the outer face of the skin.

8. The method for manufacturing a stiffened panel of composite materials, according to according to claim 1, wherein the threaded bolts are located in the areas where the longitudinal stiffeners and the transverse stiffeners meet.

9. A stiffened panel made of composite materials, comprising:
    a skin in laminar form that comprises an inner face and an outer face,
    stiffeners located on the inner face of the skin and in longitudinal and transverse directions thereto,
    a set of through drill holes located on the skin in correspondence with areas where the placement of stiffeners is expected,
    a set of threaded bolts configured for the joining of the skin and the stiffeners and located in the set of through drill holes, wherein the threaded bolts comprise a body and a head,
    a threaded nut located on a free end of the threaded bolts opposite the head,
    wherein the heads of the threaded bolts are embedded in the skin and the threaded bolts and the body are embedded in the stiffeners, and
    wherein the stiffeners include a plurality of stacked layers of composite material on top of the inner face of the skin.

10. The stiffened panel made of composite materials, according to claim 9, wherein the threaded bolts are located in the areas where the longitudinal stiffeners and the transverse stiffeners meet.

* * * * *